United States Patent [19]

Erikson

[11] Patent Number: 4,542,523
[45] Date of Patent: Sep. 17, 1985

[54] RADIOGRAPHIC INTENSIFYING SCREEN MANIPULATOR

[75] Inventor: Herman E. Erikson, Winchester, Mass.

[73] Assignee: Polaroid Corporation, Cambridge, Mass.

[21] Appl. No.: 378,766

[22] Filed: May 17, 1982

[51] Int. Cl.[4] .............................................. G03B 41/16
[52] U.S. Cl. ..................................... 378/167; 378/183; 378/204
[58] Field of Search ........................ 378/167, 183, 204

[56] References Cited

U.S. PATENT DOCUMENTS 3,462,599  8/1969  Erikson .............................. 378/183
3,505,939  4/1970  Hu .
3,586,501  6/1971  Norquist .

Primary Examiner—Craig E. Church
Attorney, Agent, or Firm—John S. Vale

[57] ABSTRACT

A radiographic apparatus for facilitating insertion of a radiographic element on a carrier into the retractable opaque envelope of a film unit for exposure purposes, and for facilitating its later removal, includes a housing having a light tight chamber for receiving the carrier and film unit arranged in superposed relation therein. When the housing is in an upright loading position and the envelope is retracted, gravitational force urges the carrier into contact with the negative sheet so that both are enclosed when the envelope is moved back to its closed position. During removal operations, the housing is inverted, allowing gravitational force to urge the carrier away from the negative sheet so that the envelope passes therebetween when returned to its closed position, leaving the carrier outside of the envelope.

21 Claims, 8 Drawing Figures

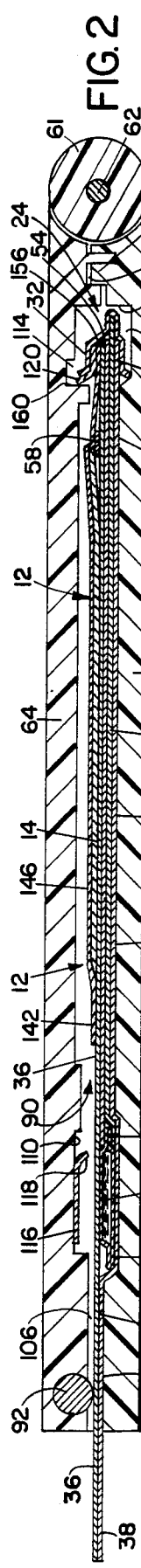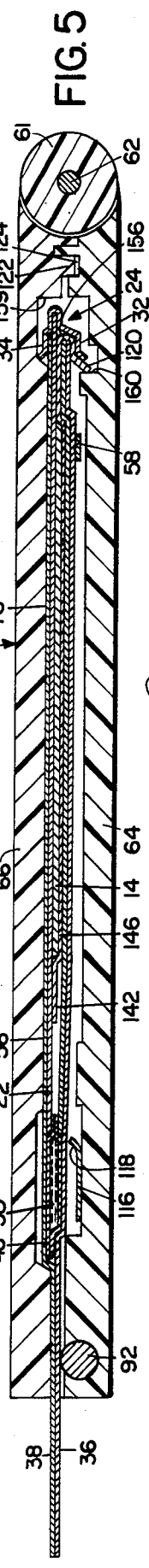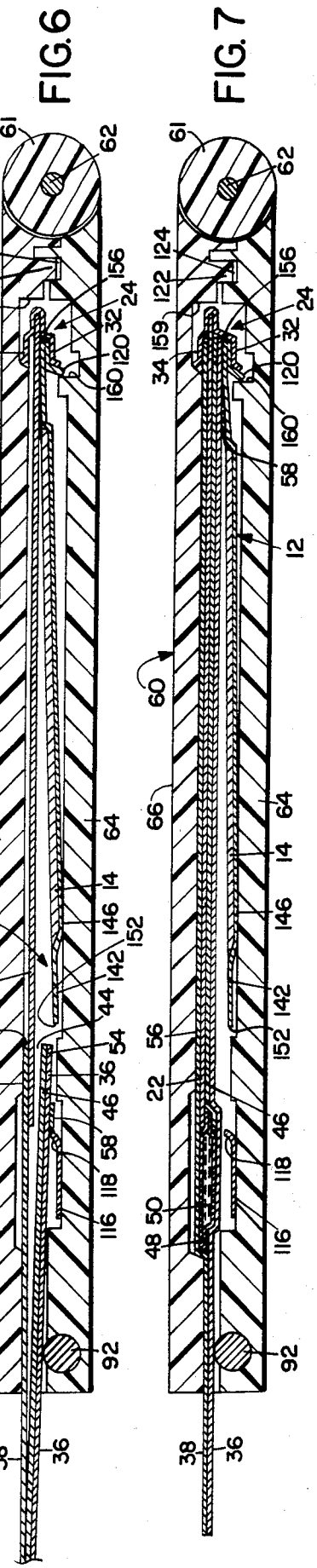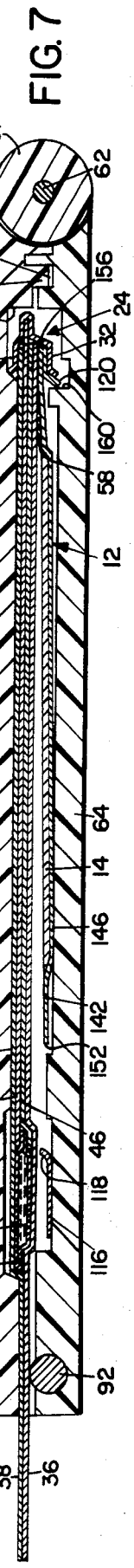

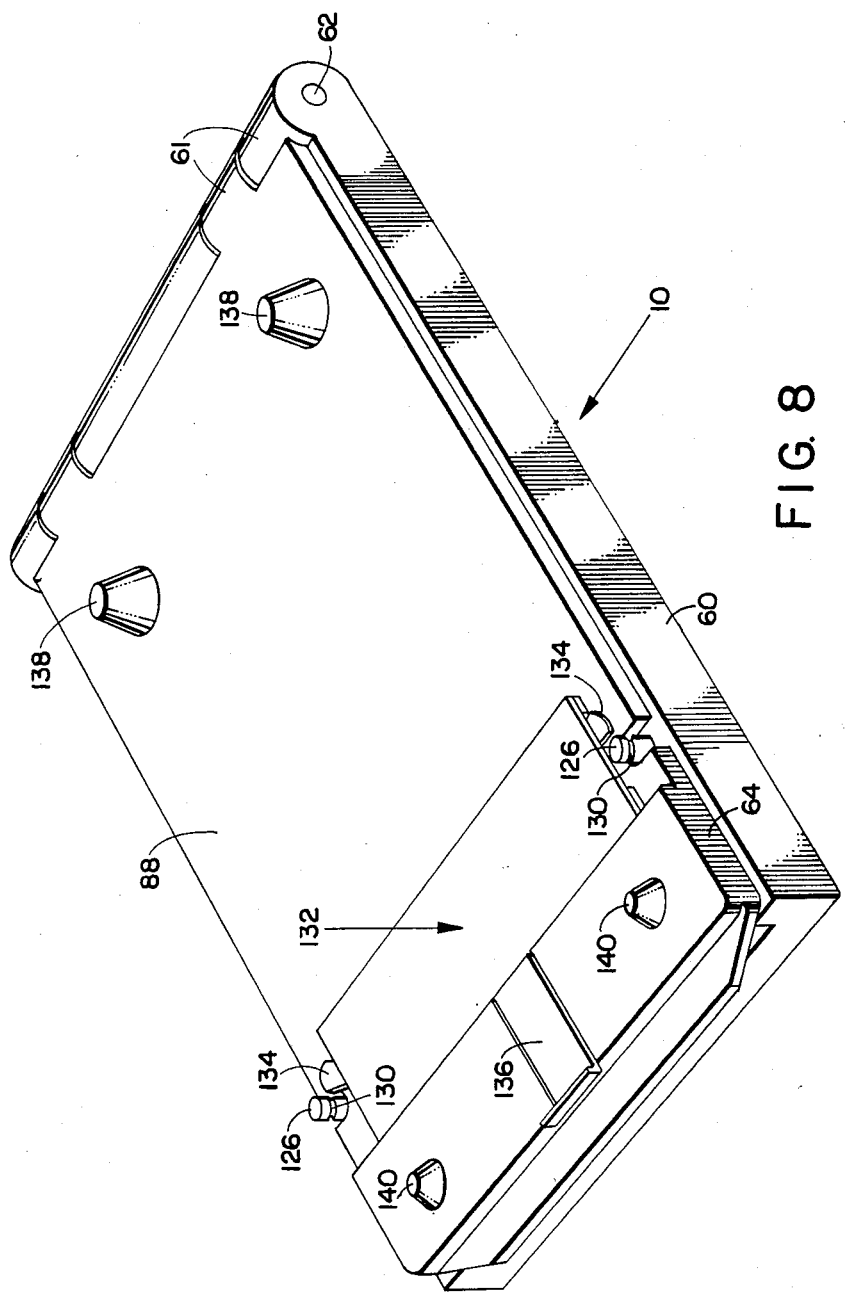

RADIOGRAPHIC INTENSIFYING SCREEN MANIPULATOR

BACKGROUND OF THE INVENTION

The present invention relates to the field of radiology and, more specifically, to apparatus for converting a commercially available film assembly, primarily intended for conventional photographic applications, into a radiographic film assembly by incorporating an intensifying screen or other types of radiographic elements thereinto that emit light in the visible spectrum to expose the film when struck by X-ray or nuclear energy.

In the illustrated embodiment, the conventional film assembly is a 4"×5"self-developing film packet of the type manufactured and marketed by Polaroid Corporation, Cambridge, Massachusetts, under the trade designations Types 51, 52, 55 P/N, 57 and 58, among others, and essentially configured as disclosed in commonly-assigned U.S. Pat. No. 3,586,501.

Each of these film assemblies includes a photosensitive or negative component and a retractable opaque cover envelope having a positive or image receiving sheet releasably secured to one interior surface thereof and a rupturable pod of fluid processing composition secured to an opposite interior surface thereof.

The photosensitive component includes a negative sheet having a photosensitive emulsion or negative layer thereon and a metal retaining clip secured to the trailing end of the negative sheet.

The opaque cover envelope is sealed along three of its sides and the negative sheet is inserted thereinto through an opening at the trailing end. When the negative sheet is at its fully inserted position, the positive or image receiving sheet is disposed in face-to-face relation with the negative sheet and the open end of the envelope is slidably received in the metal clip to light seal the trailing end of the assembly.

The film assembly is configured for use with a film holder-processor, hereinafter termed a "film holder" such as the Polaroid Land 4×5 Film Holder No. 545 sold by Polaroid Corporation and described in commonly-assigned U.S. Pat. No. 3,505,939.

The film holder has an exposure opening in a front wall thereof and is adapted to be mounted on the back of a 4×5 view camera or the like. The film assembly is advanced through a slot in the end of the holder to a fully inserted position where a latching mechanism releasably engages the metal clip thereby securing the trailing end of the negative sheet. With the negative sheet secured, the envelope is partially withdrawn from the holder to a retracted position thereby uncovering the photosensitive portion of the negative sheet for exposure to image forming light transmitted through the exposure aperture. Following exposure, the envelope is returned to its closed or fully inserted position thereby recovering the negative sheet and positioning the positive sheet in face-to-face relation with the exposed photosensitive portion. Upon release of the latch holding the metal clip, a pair of pressure applying rollers adjacent the withdrawal slot move into position to define a narrow gap therebetween. The film assembly is then withdrawn from the holder between the pressure applying rollers which rupture the pod and distribute the fluid processing composition between the positive and negative sheets to initiate a well-known development and diffusion transfer process. Following a suitable imbibition period, the envelope is opened and the superposed sheets are peeled apart to reveal a positive image on the image receiving sheet.

The idea of inserting an intensifying screen or other type of radiographic element into the opaque envelope of such a film assembly to convert it for radiographic use is well-known in the prior art.

For example, commonly-assigned U.S. Pat. No. 3,462,599 is directed to a radiographic apparatus for inserting a radiographic element comprising an intensifying screen or a radioactive source in combination with an intensifying screen or layer into a self-processing film pack of the type described above.

The radiographic element is mounted on a thin magnetically attractable metal carrier sheet that is inserted into the 4"×5" film holder-processor to position it on top of a film assembly therein. The film holder is then inserted into a support frame that has a movable permanent magnet carrier manipulator thereon. To insert the carrier into the opaque cover envelope, the permanent magnet is located in a neutral position where it does not magnetically influence the metal carrier. The envelope is retracted so that gravitational force urges the leading end of the carrier into engagement with the now uncovered negative sheet. As the envelope is pushed back into the holder, it slides over both the negative sheet and the superposed carrier thereby effecting insertion of the radiographic element into the envelope in face-to-face relation with the photosensitive portion of the negative.

Movement of the permanent magnet to a second neutral position releases the latch holding the metal clip on the end of the film assembly so it may be withdrawn from the film holder for exposure. Following exposure, the film assembly is reinserted into the film holder where its trailing end clip is engaged by the latch mechanism. Once again, the envelope is withdrawn to its retracted position. Now, the permanent magnet is moved to a third position where it magnetically attracts the carrier and lifts its leading end away from the negative sheet. With the carrier held in its raised position spaced from the negative sheet, the envelope is pushed back into the holder so as to pass between the carrier and the negative sheet. Thus, the negative sheet is enclosed by the opaque envelope and the carrier mounting the radiographic element remains on the exterior of the envelope. Thereafter, the clip holding latch is released and the rollers are moved to their pressure applying position so that the processing fluid is distributed between the positive and negative sheets in response to withdrawing the film assembly from the film holder-processor.

While the above-described apparatus performs satisfactorily, it does have certain disadvantages. For example, the need for a permanent magnet, the magnetically attractable metal carrier and a metal plate for neutralizing the force of the magnet when it is in two of its three operative positions increases materials costs. Movably mounting the magnet and providing adequate structure to insure that it is positively located in each of its three operative positions increases the mechanical complexity of the device thereby adding to manufacturing costs.

Therefore, it is object of the present invention to provide apparatus for associating and disassociating a radiographic element with a conventional film unit, of the type described above, which is easy to use, simply constructed and low in cost.

Other objects of the invention will, in part, be obvious and will, in part, appear hereinafter.

SUMMARY OF THE INVENTION

The present invention provides a radiographic apparatus, usable with a film assembly including a photosensitive component and a retractable opaque cover envelope, for selectively inserting a radiographic element into the envelope and also removing it therefrom. The apparatus is simple in its construction and is operable to take advantage of gravitational force in manipulating the insertion and removal of the radiographic element.

The apparatus comprises a carrier having a radiographic element thereon and a housing having a light excluding chamber for receiving such a film assembly and carrier arranged in superposed relation therein. The housing is configured to provide access to the envelope for moving it between a closed position covering a photosensitive portion of the photosensitive component and a retracted position wherein the photosensitive portion is uncovered. The housing also is configured for operation in an upright insertion position and, alternatively, an inverted removal position.

Means are provided within the chamber for releasably retaining corresponding trailing end portions of the photosensitive component and the superposed carrier to prevent their movement in the direction of envelope displacement between its closed and retracted positions.

A support surface, located in the chamber and operative when the housing is in its upright insertion position, is provided for supportively engaging a film assembly having the carrier superposed on top thereof so that when the envelope is moved from the closed position to the retracted position, gravitational force urges a leading end portion of the carrier into engagement with the underlying uncovered photosensitive portion and, in response to movement of the envelope back to its closed position, it slides over and encloses both the carrier and the photosensitive portion to effect insertion of the radiographic element into the envelope.

The housing also includes means, operative during removal operations when the housing is located in its inverted position to locate the carrier in the envelope below the photosensitive portion, for supporting at least a leading end of the photosensitive portion such that, after the envelope is moved to its retracted position, gravitational force urges the leading end of the carrier away from the photosensitive portion thereby allowing the envelope to pass therebetween as it is moved back to its closed position so as to enclose the photosensitive portion while leaving the carrier outside of the envelope to effect removal of the radiographic element.

BRIEF DESCRIPTION OF THE DRAWINGS

For a fuller understanding of the nature and objects of the invention, reference should be had to the following detailed description taken in connection with the accompanying drawings wherein:

FIG. 2 is a longitudinal cross-section of the housing shown in its upright insertion position with a film assembly and superposed carrier located therein;

FIG. 3 is similar to FIG. 2 except that the opaque cover envelope of the film assembly has been moved to its retracted position;

FIG. 4 is similar to FIGS. 2 and 3, but the envelope has been moved back to its closed position to enclose both the carrier and negative sheet of the film assembly;

FIG. 5 is a longitudinal cross-section of the housing located in its inverted removal position showing a film assembly therein having the carrier enclosed in the opaque envelope;

FIG. 6 is similar to FIG. 5 except that the envelope has been retracted allowing the leading end of the carrier to fall away from the negative;

FIG. 7 is similar to FIGS. 5 and 6 except that the envelope has been moved back to its closed position leaving the carrier outside the envelope; and FIG. 8 is a perspective view of the housing shown closed in its upright position.

DESCRIPTION OF THE PREFERRED EMBODIMENT

Figure 1:
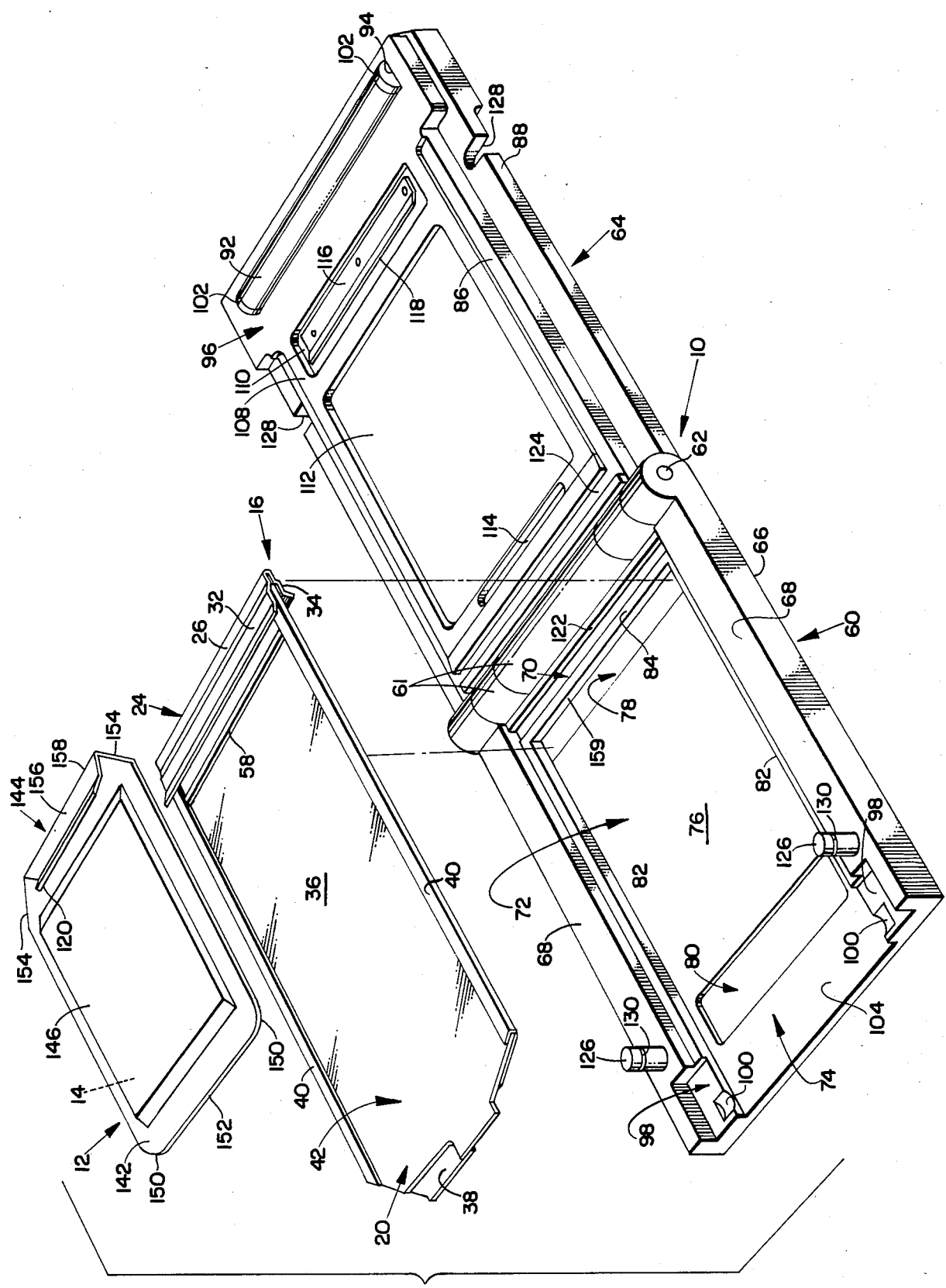
FIG. 1 is a perspective view of a housing and carrier embodying the present invention shown in exploded fashion along with a self-developiung 4×5 film assembly.

FIG. 1 shows a housing 10 and a carrier 12 forming a radiographic apparatus, embodying the present invention, for incorporating a radiographic element 14 on carrier 12 into a conventional photographic 4×5 self-developing film assembly 16 for radiographic exposure purposes and, after such exposure, for disassociating the carrier 12 from film assembly 16 so it may be processed in the normal manner.

The illustrated film assembly 16 is intended to be representative of individual 4"×5" self-developing film packets manufactured and marketed by Polaroid Corporation, Cambridge, Massachusetts, under the trade designations Types 51, 52, 55 P/N 57 and 58. A detailed description of film assembly 16 is disclosed in commonly-assigned U.S. Pat. No. 3,586,501 which is incorporated by reference herein. It should be understood, however, that the apparatus embodying the present invention is not restricted in its use to the specific film assemblies identified herein. That is, it may be used with other film assemblies having the same general structural characteristics as those set forth above.

As shown in FIGS. 1-7, each film assembly 16 includes a photosensitive or negative component 18 and a retractable light opaque envelope 20 that is movable relative to component 18 between the closed or protective covering position of FIGS. 1, 2, 4, 5 and 7, and the retracted or uncovering open position of FIGS. 3 and 6.

As most clearly illustrated in FIGS. 3 and 6, the photosensitive component 18 includes a photosensitive or negative sheet 22, comprising a support sheet having a photosensitive layer or emulsion coated on its upper surface, and a transversely disposed thin metal retaining and light sealing clip 24 folded over and securely crimped, at end 26, to the trailing end 28 of sheet 22.

Clip 24 extends across the entire width of sheet 22 and includes upper and lower flanges 32 and 34, respectively, integrally formed with end 26 and configured so as to define transversely extending channels between each of the flanges 32 and 34 and the trailing end of sheet 22 therebetween for releasably receiving trailing end portions of the envelope 20 located in its closed position.

Envelope 20 is formed by upper and lower facing sheets 36 and 38, formed of any suitable light opaque material such as paper or the like, strippably joined together along the lateral margins by adhesive tapes 40 (see FIG. 1) and transversely across their respective leading ends, at 42, by any suitable means such as a strippable adhesive, thereby leaving an opening 44 (see FIG. 3) at the trailing end through which the negative sheet 22 may be inserted into and withdrawn from envelope 20.

Releasably secured to the interior surface of upper sheet 36, so as to be movable with envelope 20, is a positive or image receiving sheet 46 which is positioned in face-to-face registration with the photosensitive portion of negative sheet 22 when envelope 20 is in its closed position. A rupturable pod 48 holding a supply of fluid processing composition 50 is secured to the interior surface of bottom envelope sheet 38 adjacent the sealed leading end of envelope 20. When envelope 20 is in its closed position, the pod 48 is located adjacent the leading ends of the superposed positive and negative sheets 46 and 22 with a rupturable rear seal 52 on pod 48 positioned to discharge the fluid between the sheets 46 and 22 in response to applying a compressive force to pod 48.

Also, when envelope 20 is in its closed position, its trailing end is slidably inserted into clip 24 to light seal opening 44 and releasably couple the envelope to the photosensitive component 18. As best shown in FIG. 2, a trailing end 54 of sheet 36 is received between the upper surface of sheet 22 and the facing upper clip flange 32 and the trailing end 56 of sheet 38 is received between the bottom surface of sheet 22 and the facing lower clip flange 34. Flanges 32 and 34 are formed to be somewhat resilient and are dimensioned so that they are forced apart slightly when the trailing end of the envelope is inserted, thereby providing a small spring force for frictionally holding the trailing end of envelope 20 in clip 24.

Film assembly 16 is a self-contained, daylight loading, self-developing film unit which utilizes the retractable opaque envelope 20 for shielding negative sheet 22 from ambient light to prevent it from being fogged. For conventional photographic applications, assembly 16 is adapted to be daylight loaded into a film holder-processor which is attached to the back of a view camera to locate negative sheet 22 at the camera's focal plane. The film holder-processor, hereinafter referred to as the "holder" is of the type disclosed in commonly-assigned U.S. Pat. No. 3,505,939.

The holder includes an elongated housing having a chamber therein for receiving film assembly 16 to position negative sheet 22 in registration with an exposure aperture in a forward wall of the housing. At one end of the housing is a slot through which a film assembly may be inserted into and withdrawn from the chamber and a pair of pressure-applying rollers which are movable between a loading position wherein the rollers are spread apart to allow passage of the film unit therebetween without rupturing the pod 48 and a processing position wherein the rollers are brought together so as to apply a compressive pressure to film assembly 16 as it is drawn therebetween when it is removed from the chamber through the insertion and withdrawal slot.

With the rollers set in the spaced apart loading position, film assembly 16 is inserted into the chamber, trailing end first, to a fully-inserted position where clip 24 is engaged by a latch mechanism thus releasably fixing the position of the negative component 18 within the holder.

The holder is mounted on the back of a camera and envelope 20 is manually moved to its retracted or open position by withdrawing it through the slot at the end of the holder. As best shown in FIG. 1, an upstanding transverse rib 58 is provided on the exterior of envelope top sheet 36 for engaging a stop in the holder to prevent envelope 20 from being completely withdrawn therefrom.

The uncovered negative sheet 22 is exposed by actuating the camera shutter and then envelope 20 is moved back to its closed position by pushing it back into the chamber. This positions the image receiving sheet 46 in face-to-face contact with the negative sheet 22 and locates the pod 48 at its operative position adjacent the leading end of the superposed sheets. In response to manually shifting the rollers to the processing position, the latch holding clip 24 is released allowing film assembly 16 to be withdrawn through the pressure applying rollers. In response to the compressive pressure, pod 48 ruptures thereby discharging the fluid 50 between the superposed positive and negative sheets where it is spread imagewise to initiate a well-known development and diffusion transfer process.

Following a suitable imbibition period, envelope 20 is opened by peeling apart the upper and lower sheets 36 and 38, starting at the leading ends thereof, thereby providing access to the positive and negative sheet laminate. The negative sheet 22 is then stripped away from the image-receiving sheet 46 to reveal a positive print on sheet 46.

Film assembly 16 may be adapted for radiographic applications by combining it with a radiographic element which converts radiant energy, such as X-rays or nuclear energy in the form of alpha, beta or gamma rays, into visible light that is used to record a latent image of the irradiated subject or specimen in the photographic emulsion on sheet 22.

For conventional medical and industrial X-ray applications, the X-ray source and subject or specimen to be photographed are located externally of the film assembly and the appropriate radiographic element 14 comprises an intensifying screen which is inserted into envelope 20 in face-to-face relation with the photosensitive emulsion on sheet 22. The screen is formed of a phosphorescent material, such as silver actuated zinc sulfide or the like, which fluoresces when struck by X-rays thereby providing a visible light replica of the X-ray image to expose the photosensitive emulsion.

It is well-known in the prior art to employ an intensifying screen for making X-ray photographs on conventional film, but, in most instances, the screen is mounted in a rigid X-ray cassette into which the film assembly is inserted. By inserting the screen directly into envelope 20, the need for such an X-ray cassette is eliminated. That is, the film assembly 16 may be placed directly in contact with the subject or specimen to be photographed. Also, by making the intensifying screen and the later-to-be-described carrier 12 somewhat flexible, the film assembly may be made to conform to certain rounded surfaces, such as the exterior or interior surface of a large diameter pipe for making X-ray photographs of welded joints or other similar applications.

Autoradiography relates to photographing subjects or specimens that include a self-contained radioactive source which admits alpha, beta or gamma rays. For example, in medical applications, organs, bones, tissue samples or body fluids may be injected or otherwise tagged with nuclear tracer chemicals or dyes. Other applications are found in chemical analysis techniques such as thin-layer chromatography.

In certain autoradiographic applications where the nuclear radiation level is low or low penetration particles such as alphas or low-energy betas are employed, the radioactive subject or specimen is covered with an intensifying screen or layer and this laminate is mounted directly on carrier 12. Locating the low energy source in close proximity to the fluorescent screen reduces exposure times. However, gross autoradiographs may be made of radioactive subjects or specimens emitting high-energy beta or gamma rays by locating an intensifying screen mounted carrier 12 within envelope 20 and placing the subject or specimen on the outside thereof.

Therefore, in autoradiographic applications, the radiographic element 14 on carrier 12 may include an intensifying screen alone or a radioactive subject or specimen in combination with an appropriate intensifying layer or screen.

In the illustrated embodiment, housing 10 takes the form of a book-opening type lighttight cassette having a base section 60 that is pivotally coupled to a cover section 64 by means of integrally formed interdigitated hinge elements 61 at the respective trailing ends of sections 60 and 64 which pivot about pin 62 for movement between an inoperative open position shown in FIG. 1 for loading a film assembly 16 and carrier 12 thereinto and a closed operative position shown in FIG. 8. The base and cover sections 60 and 64 may be formed of any suitable material that is opaque to visible light, with molded plastic construction being preferred.

Base section 60 includes a generally planar bottom wall 66 having an upstanding three-sided peripheral frame thereon defined by a pair of longitudinally extending side wall sections 68 and a transverse trailing end section 70. This structure cooperates with bottom wall 66 to form a major cavity 72 within base section 60. Cavity 72 is open at the leading end 74, opposite section 70, and has its lowermost or interior support surface 76 formed by the interior side of bottom wall 66.

A transverse trailing end depression 78 is formed in surface 76 for accommodating the clip 24 on film assembly 16. Also, a shallow transverse depression 80 is formed in surface 76, adjacent its leading end, so as to underlie the pod 48 when film assembly 16 is located on surface 76. The provision of depression 80 increases the interior vertical space in between the cover and base sections in the vicinity of pod 48 when the cassette is closed to insure that the pod is not subjected to a compressive pressure sufficient to cause it to rupture when cover section 64 is moved to its closed position.

Integrally formed with side walls 68 and trailing end section 70 is a stepdown spacing and light sealing structure, defined by a pair of longitudinally extending side rails 82 and a coplanar transverse trailing end rail 84, on which a conforming raised plug structure 86, extending upwardly from the interior side of a planar cover top wall 88, is seated when cover section 64 is closed to define a light excluding receiving chamber 90 (see FIGS. 2-7) in housing 10.

The plug 86 is somewhat T-shaped and includes a soft rubber roller 92 rotatably mounted in a well 94 formed in the wider leading end portion 96 of plug 86. End portion 96 is configured to conformingly fit into a widened leading end of cavity 72 defined by opposed recessed sections 98 in side walls 68. A shallow transversely disposed trough or depression 100 is provided in each of the bottom walls of the recesses 98 for rotatably supporting the lateral ends 102 of roller 92 and also accurately space the roller 92 from the leading end portion 104 of support surface 76 to define a laterally extending withdrawal slot 106 at the leading end of the closed housing 10 through which the opaque envelope 20 may be advanced to move it between its closed and retracted positions. The face of the soft rubber roller 92 is compressed slightly when it is in engagement with the top sheet 36 of envelope 22 and serves to facilitate envelope withdrawal and insertion by reducing friction while also providing a light seal for withdrawal slot 106.

The interior facing surface 108 of plug 86 has three depressions or wells 110, 112 and 114 therein. The first depression 110, closest to roller 92, has a metal plate 116 secured to the bottom wall thereof. The trailing end 118 of plate 116 is bent downwardly, as viewed in FIGS. 2-7 so as to project into chamber 90 ahead of the withdrawal slot 106 where it serves as a stop against which the upstanding rib 58 on envelope top sheet 36 bears to prevent complete withdrawal of envelope 20 from chamber 90 and define its retracted position (see FIGS. 3 and 6). Alternatively, end 118 may be provided in the form of an integrally molded depending rib in well 10.

The second depression 112 is dimensioned to be slightly larger than the major dimensions of the carrier sheet 12 and, as will be apparent later, provides space into which a portion of carrier 12 is deflected by gravitational force, when housing 10 is in its inverted position, to facilitate removal of carrier 12 from the interior of envelope 20.

The third depression 114 is narrower in its lateral dimension and somewhat deeper than depressions 110 and 112. As will become apparent later, it is dimensioned and configured to receive and capture an upstanding tab 120 adjacent the trailing end of carrier 12 to fix the longitudinal position of carrier 12 within chamber 90 when cover section 64 is located in its closed position.

To light seal the trailing end of housing 12, in the vicinity of hinge structure 61, the base section 60 includes a transversely disposed rib 122 that extends into a complimentary transverse channel 124 on plug 86 when cover 64 is closed to define a labyrinth-type light trap.

As best shown in FIGS. 1 and 8, base section 60 also includes a pair of upstanding latching pins 126 mounted on side wall sections 68 near the leading ends thereof. Cover section top wall 88 includes a pair of complimentary notches 128 therein through which pins 126 extend when cover section 64 is closed to locate circumferential recesses grooves 130 in pins 126 just above the exterior surface of the cover topwall 88.

Cover section 64 has a latch mechanism 132 on the leading end thereof which includes an internal linkage (not shown) for pivoting a pair of latching arms 134 back towards pins 126 in response to slidably retracting a latch actuator member 136 so that the free ends of arms 134 seat within the pin grooves 130 to releasably latch cover section 64 in its closed position.

Also mounted on the exterior of cover top wall 88 are a pair of trailing end feet 138 and a pair of shorter leading end feet 140 for supporting housing 10, when it is inverted, in a level position on a horizontal support surface such as a desk or tabletop. Feet 138 and 140 have not been shown in FIGS. 2-7 in the interest of conserving space to provide all of the drawings illustrating the sequence of operations on a single sheet.

The carrier 12 is preferably formed of a thin, light opaque, somewhat stiff, thermoplastic sheet material, although it could be found of metal if desired. It includes a base sheet 142 and an integrally formed foldedover coupling section 144 which terminates in the upstanding tab 120. The base sheet 142 is dimensioned to have a width that is slightly narrower than envelope opening 44 to facilitate insertion and withdrawal. In a preferred embodiment, the sheet 142 is vacuum formed to include a centrally disposed raised hollow dome 146 providing a recess or cavity on the underside of base sheet 142 for receiving and supporting the flat radiographic element 14 which is secured in the recess by any suitable means such as adhesive bonding or the like.

The leading end of sheet 142 has rounded corners 150 to define a somewhat narrower leading edge 152 for facilitating initial insertion of the carrier into envelope opening 44. The leading end of sheet 142 may be heat formed to bend down slightly thereby assuring that leading edge 152 will make positive contact with the negative sheet 22 when envelope 20 is retracted to the position of FIG. 3.

The trailing end of sheet 142 narrows down to the narrower width of coupling section 144, thus providing angled or tapered trailing end corners 154 to facilitate withdrawal of the carrier from the envelope by eliminating sharp, full width corners that may bind with the lateral margin portions of envelope 20.

Coupling section 144 comprises a tapered flap portion 156 that is folded back over the top surface of sheet 142 at trailing end edge 158 and terminates in the upstanding tab 120 that is dimensioned to fit into a recess 114 in cover section 64.

In operation, the carrier sheet 12, having the radiographic element 14 mounted thereon, is operatively and releasably coupled to film assembly 16 by placing it on top of envelope sheet 36 and slidably inserting the folded-over trailing end of the carrier into clip 24 between the exterior surface of the envelope trailing end 54 and the facing interior surface of clip flange 32 as best shown in FIG. 2. The resilient nature of the clip flanges allowes flange 32 to deflect upwardly for accommodating the trailing end of carrier 12 without permanently deforming flange 32 or diminishing its ability to spring back and light seal the open end of envelope 20 after the trailing end of carrier 12 is withdrawn therefrom. The end of the carrier 12 is releasably held in clip 24 by frictional forces. When the carrier is fully inserted in the clip 24, the tab 120 is left protruding from the clip and extends upwardly at an acute angle with respect to the plane of the carrier base sheet 142 and the underlying envelope 20.

To load the coupled film assembly and carrier into housing 10, it is placed in its upright loading position with base section 60 supported on any convenient horizontal support surface such as a table or desk top. Cover section 64 is unlatched and moved to the open position of FIG. 1. The coupled film assembly and carrier is placed on support surface 76 of cavity 72 with the underside sheet 38 of envelope 20 in contact therewith. The clip 24 rests in depression 78 and assembly 16 is moved rearwardly so that the trailing end 26 of clip 24 abuts against a vertical locating surface 159 of rail 84 which initially locates assembly 16 longitudinally within cavity 72 for loading purposes. Later, as noted earlier, the pod 48 in envelope 20 is positioned in overlying relation to recess 80.

The cover section 64 then is closed and latched. When this is done, the tab 120 on carrier 12 extends upwardly into recess 114. Tab 120 is engagable with a transversely extending vertical wall 160 in recess 114 which prevents longitudinal movement of carrier 12 toward the withdrawal slot 106 at the opposite end of chamber 90. Because the clip 24 is hooked over the trailing end of carrier 12 and the clip is securely crimped to the negative sheet 22, longitudinal movement of the negative component of assembly 16, to the left as viewed in FIGS. 2-7, also is prevented. Movement of the negative component 18 and attached carrier 12 in the opposite direction is limited by the abutment of the end 26 of clip 24 against locating surface 159. Thus, the engagement of tab 120 with wall 160 and locating surface 159, effectively serve as a means for releasably retaining and fixing the longitudinal position of both the carrier 12 and the underlying negative component (clip 24 and negative sheet 22) of film assembly 16 within the receiving chamber 90 of housing 10.

With the negative component and superposed carrier 12 so restrained, the envelope 20 may be manually withdrawn from slot 106 until rib 58 abuts end 118 of retaining plate 116. This locates envelope 20 in its retracted position uncovering the photosensitive portion of sheet 22 that is to have an image recorded thereon. Once envelope 20 is retracted, gravitational force urges the carrier 12 downwardly toward negative sheet 22 so that at least the free leading end edge 152 of carrier base sheet 142 is in engagement with the upper surface of the underlying negative sheet 22. As shown in FIG. 3, when the envelope 20 is fully retracted, it does not completely uncover sheet 22 and a small leading end portion thereof remains within the envelope. But, envelope 20 is retracted far enough to clear the leading end of carrier 12.

Now, as envelope 20 is pushed back into chamber 90, the bottom sheet 38 of the envelope slides under negative sheet 22 and the top sheet 36 of the envelope rides up and over the leading end of the carrier 12 so that envelope 20 encloses both the negative sheet 22 and the carrier 12 on top thereof as shown in FIG. 4. As the open end of the envelope 20 is advanced into the clip 24, the trailing end 56 of sheet 38 is reinserted into clip 24 between the underside of negative sheet 22 and the facing flange 34. The trailing end 54 of the upper sheet 36 meanwhile engages the inclined tab 120 and is cammed thereby down into the fold at the trailing end of carrier 12 between flap 156 and the underlying portion of base sheet 142. Tab 120 is preferably inclined with respect to the plane of base sheet 142, rather than being perpendicular thereto, so that it also performs the function of camming the end 54 of the envelope into the fold, thereby re-establishing the light seal for the envelope opening 44. Thus, by arranging housing 10 in its upright loading position and locating the coupled film assembly 16 and carrier 12 therein as described, the carrier base sheet 142 may be effectively inserted into envelope 20 to position the radiographic element 14 in face-to-face relation with the negative emulsion on sheet 22 simply by pulling the envelope 20 out to its retracted position, allowing the downward gravitational force to urge the carrier 12 into contact with the negative sheet 22 and, thereafter pushing the envelope 20 back to its closed position to enclose both the base sheet 142 of carrier 12 and negative sheet 22.

Following insertion of carrier 12, cover section 64 is opened and film assembly 16 is removed from cavity 72 for exposure. For conventional X-ray applications, assembly 16 is mounted in the exposure plane of an X-ray machine. When used in the field with a portable X-ray source, such as in an emergency medical situation or for industrial X-rays of pipes or other large structures, the film assembly is simply placed behind the subject or specimen to be photographed in the path of X-rays transmitted therethrough. For autoradiographic applications, wherein radiographic element 14 includes a radioactive source in addition to the intensifying screen or layer, film assembly 16 may be left in housing 10, if the exposure time is relatively short, or it may be removed therefrom so that the actual exposure takes place externally of housing 10.

After exposure, carrier base sheet 142 must be removed from envelope 20 before film assembly 16 is processed to extricate it from its position between the negative sheet 22 and the positive sheet 46 releasably secured to the inside of envelope top sheet 36.

To remove base sheet 142, the film assembly 16 is loaded into housing 10, located in its upright loading position, in the manner previously described. When cover section 64 is closed, the upstanding carrier tab 120 is once again captured in recess 114. Then, housing 10 is turned upsidedown and placed on a horizontal support surface in its inverted removal position shown in FIGS. 5–7.

Now, with the film assembly in the inverted position shown in FIG. 5, the envelope 20 is pulled out through withdrawal slot 106 until it reaches the fully retracted position of FIG. 6 with rib 58 on envelope sheet 36 in engagement with tip 118 of retention plate 116. As noted earlier, a small leading end portion of negative sheet 22 remains within the confines of envelope 20 when it is fully retracted. Since the housing structure defining exit passageway 106 is fairly narrow, the leading end of the retracted envelope is held in proximity to the support surface 76 in base section 60. And, because the leading end of negative sheet 22 extends into the open end of envelope 20 and is supported thereby, sheet 22 is limited in the vertical distance that it is displaced away from support surface 76 due to the downwardly directed gravitational force thereon. However, the carrier 12 is completely free of the retracted envelope 20 and its free leading end is deflected downwardly by the gravitational force into the underlying depression 112. The depth of depression 112 is intentionally set so that there is sufficient clearance for the leading edge 152 of carrier 12 to be deflected away from negative sheet 22 to create a space 170 therebetween. Because the leading edge 152 of carrier base sheet 142 is now located below the trailing end 54 of the envelope sheet 36, the underside of the envelope carrying the negative sheet 46 thereon enters the space 170 as envelope 20 is pushed back into chamber 90, thereby passing between negative sheet 22 and carrier 12 so that carrier 12 is left on the exterior of envelope 20 when it reaches its closed position shown in FIG. 7. The trailing end of the envelope is reinserted back into clip 24 to re-establish the light seal.

Housing 10 is turned over once again to locate it in its upright loading position and cover 64 is opened to remove the film assembly 16 having the carrier 12 releasably attached to the exterior of envelope 20 by the coupling of its trailing end with clip 24. Carrier 12 is disengaged from film assembly 20 by pulling the captured portion thereof out of clip 24.

Film assembly 16 now is ready to be processed. As noted earlier, it may be slidably inserted into a film holder/processor of the type disclosed in commonly assigned U.S. Patent No. 3,462,599. Upon withdrawing film assembly 16 between a pair of pressure applying rollers mounted thereon, pod 48 is ruptured and the fluid processing composition is distributed imagewise between the superposed negative and positive sheets to initiate a well-known development and diffusion transfer process. Following a suitable imbibition period, envelope 20 is opened and the negative and positive sheets are peeled apart to reveal a positive print on image receiving sheet 46.

Since certain changes may be made in the abovedescribed apparatus without departing from the scope of the invention herein involved, it is intended that all matter contained in the above description or shown in the accompanying drawings shall be interpreted as being illustrative and not in a limiting sense.

What is claimed is:

1. Radiographic apparatus, usable with a film assembly including a photosensitive component and a retractable opaque cover envelope, for selectively inserting a radiographic element into the envelope and also removing it therefrom, said apparatus comprising:

a carrier having such a radiographic element thereon;

a housing having a light excluding chamber therein for receiving such a film assembly and said carrier arranged in superposed relation therewith while providing access to the envelope for moving it between a closed position covering a photosensitive portion of the photosensitive component and a retracted position wherein said photosensitive portion is uncovered, said housing being configured for operation in an upright insertion position and, alternatively, in an inverted removal position;

means for releasably retaining trailing end portions of the photosensitive component of the film assembly and said superposed carrier located in said chamber to prevent their movement in the direction of envelope displacement between said closed and retracted positions;

a support surface, located in said chamber and operative when said housing is in said upright insertion position, for supportively engaging the film assembly having said carrier superposed on top thereof so that when the envelope is moved from said closed to said retracted position, gravitational force urges a leading end portion of said carrier into engagement with the underlying uncovered photosensitive portion and in response to movement of the envelope back to its closed position it slides over and encloses both said carrier and photosensitive portion to effect insertion of the radiographic element into said envelope; and means, operative during removal operations when said housing is in its said inverted position to locate said carrier in the envelope below said photosensitive portion, for supporting at least a leading end of the photosensitive portion such that after the envelope is moved to its said retracted position, gravitational force urges said leading end portion of said carrier away from the photosensitive portion allowing the envelope to pass therebetween as it is moved back to its closed position, thereby enclosing the photosensitive portion and leaving said carrier outside of the envelope to effect removal of said radiographic element.

2. The apparatus of claim 1 wherein said carrier is configured to be releasably secured to the photosensitive component, and said retaining means includes a retaining member on said carrier and means in said housing configured to be engaged by said retaining member.

3. The apparatus of claim 1 wherein the leading end of the photosensitive component remains within the trailing end of the envelope located in its said retracted position, and said means for supporting the leading end of the photosensitive component when said housing is inverted includes means for supporting the trailing end of the retracted envelope so it in turn supports the leading end of the photosensitive component therein.

4. The apparatus of claim 1 wherein said chamber in said housing is defined to include a recess positioned below said carrier when said housing is in said inverted position for receiving at least the leading end of said carrier when it is urged away from the photosensitive component by gravitational force.

5. The apparatus of claim 1 wherein the photosensitive component includes a negative sheet having the photosensitive portion thereon and a clip secured to the trailing end of the negative sheet and said carrier includes a trailing end portion configured to be engagingly received in the clip to releasably secure said carrier to the negative component with said radiographic element in superposed relation with respect to the negative sheet.

6. The apparatus of claim 5 wherein said carrier includes a base sheet mounting said radiographic element, and a retaining tab projecting outwardly from said trailing end of said carrier when said trailing end is received in said clip.

7. The apparatus of claim 6 wherein said retaining means includes said retaining tab and a retaining member in said housing configured to be engaged by said tab to inhibit motion of said carrier and the negative component releasably secured thereto in the direction of movement of the envelope between its closed and retracted positions.

8. The apparatus of claim 7 wherein said retaining means also includes a surface in said housing engagable by the clip.

9. The apparatus of claim 7 wherein said housing includes a recess configured to receive said tab and said retaining member includes a surface defining said recess.

10. The apparatus of claim 9 wherein said housing is a cassette including a base section having said support surface therein and a cover section having said tab receiving recess therein, said base and cover sections being pivotally coupled together for relative movement between an open position for facilitating placement of the film assembly and said carrier on said support surface, and a closed position wherein said base and cover sections cooperate to define said light excluding chamber and said tab is received in said recess.

11. The apparatus of claim 10 wherein said base and cover sections, located in said closed position, include means thereon for cooperating to define a light sealed withdrawal slot communicating with said chamber through which the envelope is moved between its closed and retracted positions.

12. The apparatus of claim 10 wherein said cover section includes a recess therein for receiving at least the leading end of said carrier when said cassette is inverted and the leading end of said carrier is urged away from said photosensitive component by gravitational force.

13. The apparatus of claim 1 wherein the photosensitive component includes a negative sheet having the photosensitive portion thereon and a clip secured to the trailing end of the negative sheet for releasably receiving an open trailing end of the envelope, located in its closed position, to light seal the trailing end of the film assembly and said carrier includes a trailing end portion configured to be releasably received in the clip for releasably securing said carrier to the film assembly so that said carrier is initially on the exterior of the envelope located in its closed position.

14. The apparatus of claim 13 wherein said carrier includes a base sheet mounting said radiographic element and said trailing end portion of said carrier includes a trailing end portion of said base sheet and a flap folded back over the top thereof.

15. The apparatus of claim 14 wherein said retaining means includes a tab on said flap which projects out of the clip when said trailing end of said carrier is received therein.

16. The apparatus of claim 15 wherein said retaining means further includes a surface in said housing configured to be engaged by said tab.

17. The apparatus of claim 15 wherein said tab is set at an acute angle with respect to the plane of said base sheet and serves to cam a trailing end portion of the envelope into the fold between said flap and said base sheet when the envelope is returned to its closed position to effect insertion of the radiographic element.

18. The apparatus of claims 14 or 17 wherein said base sheet has a dome thereon defining a cavity on the underside of said base sheet for receiving said radiographic element therein.

19. The apparatus of claim 18 wherein the leading and trailing end portions of said base sheet are of narrower width than a portion of said base sheet therebetween for facilitating movement of said base sheet through an end opening in the envelope.

20. The apparatus of claim 1 wherein said radiographic element is an intensifying screen.

21. The apparatus of claim 20 wherein said radiographic element additionally includes a radioactive source.

* * * * *